United States Patent Office 2,777,171
Patented Jan. 15, 1957

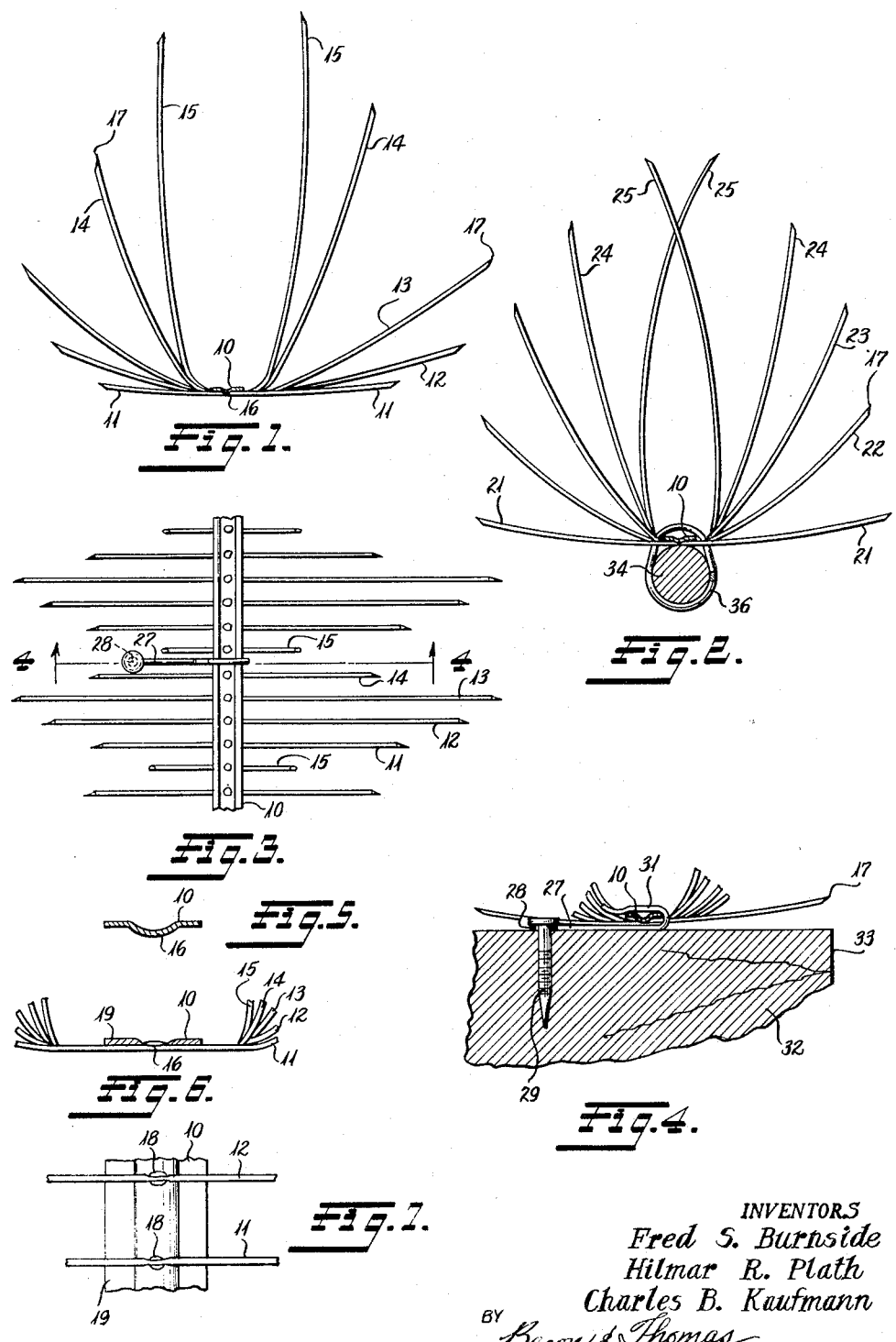

2,777,171

BIRD AND RODENT BARRIER

Fred S. Burnside and Hilmar R. Plath, Davenport, Iowa, and Charles B. Kaufmann, Moline, Ill.; said Burnside and said Plath assignors to said Kaufmann Application January 19, 1951, Serial No. 206,772

5 Claims. (Cl. 20—1)

This invention relates to a bird and rodent barrier, and more particularly to a simple and inexpensive structure which may be easily installed on buildings and other structures to prevent the alighting of birds or the passage of animals, such as rodents.

Various guards or barriers for birds and the like have been proposed involving complicated structures of wire or sheet metal or both, some of which have been partly successful, but none of them provides the ease of installation and the efficiency of operation of the barrier obtained by the structure of the present invention. The barrier of the present invention is a simple structure having a plurality of sharply pointed spring wire members extending outwardly and upwardly so as to present a plurality of sharp points distributed over the surface of the barrier. It is preferably made of non-corroding or non-rusting metal throughout so that it is permanent when installed and so that it does not stain structures to which it is applied. One major advantage of the present structure is that it may be detachably secured to buildings or the like in a manner enabling its rapid removal and reinstallation. For example, installations on building ledges may be temporarily removed for window cleaning and the like. Since the entire structure is made up of members of relatively small cross-section, it is inconspicuous and does not deface structures to which it is applied.

Although one of the major uses of the present structure is the application to building ledges to prevent the alighting of birds thereon, the barrier of the present invention has utility in many other fields. For example, it may be employed as a rodent guard for ship's cables or as a rodent guard for granaries, etc. It is also useful as a guard to protect trees from being gridled by rabbits and may be employed on the top of fences and the like, both as a guard to prevent poultry from alighting on the top of the fence in an effort to escape from poultry yards or the climbing of small animals over such fences. It may also be employed as an effective guard against humans attempting to climb over security fences. The barrier is versatile in that it may be applied in various ways. That is to say, it may be applied to flat surfaces with suitable securing members such as nails or screws or to members of small cross-section by attaching wires. Also, the body portion of the barrier is preferably made of deformable or malleable metal so that it may be easily bent around corners or wrapped around posts, cables, trees, etc.

As stated above, the barrier of the present invention provides a plurality of sharp pointed spring wire members distributed over the surface of the barrier, but nevertheless the structure is humane, since birds, for example, completely avoid the barrier structure and will not alight near it, probably because of their keen eyesight and recognition of the sharp points provided. In fact, a single barrier applied near the edge of a relatively wide building ledge is entirely effective since birds will not fly over the barrier and alight on the building side of the ledge. For extremely wide ledges, two or more barriers may be employed and may be spaced a considerable distance apart without danger of birds alighting between the barriers. It has also been found that small animals such as rodents will approach the barrier but will not come in contact therewith so that painful injury to birds or animals does not occur.

It is, therefore, an object of the present invention to provide an improved bird or rodent barrier which is simple in structure and efficient in operation.

Another object of the present invention is to provide a bird or rodent barrier which is easily installed on various structures including buildings, ledges, fences, grain storage structures, cables, trees, etc.

A further object of the invention is to provide an improved barrier which is particularly effective against birds and small animals and which is inconspicuous and easy to apply and remove.

A still further object of the invention is to provide a bird and rodent barrier presenting a plurality of sharp pointed spring members distributed over the surface of the barrier, but which birds and small animals avoid so as to obviate painful injury thereto.

Other objects and advantages of the invention will appear in the following description of the invention shown in connection with the attached drawings, of which:

Fig. 1 is a vertical section through one modification of the present invention;

Fig. 2 is a view similar to Fig. 1 showing a somewhat modified structure and one manner of attaching the barrier;

Fig. 3 is a fragmentary plan view of the structure of Fig. 1 showing another manner of attaching the barrier;

Fig. 4 is a fragmentary vertical section taken on the line 4—4 of Fig. 3;

Fig. 5 is a vertical section through the base member of the barrier on an enlarged scale before the transversely extending members are applied;

Fig. 6 is a fragmentary vertical section showing the base member of Fig. 5 with the transversely extending members applied; and Fig. 7 is a fragmentary plan view of the structure of Fig. 6.

Referring more particularly to the drawings, the structure of Figs. 1, 3, 4 and 5 to 7 may include a base member 10 and a plurality of transversely extending or cross members 11, 12, 13, 14 and 15. The base member 10 is preferably a narrow strip of thin sheet metal having a downwardly extending ridge 16 formed therein so as to be centrally disposed and run lengthwise of the base member 10. The base member 10 is preferably made of malleable or bendable metal, i. e., metal which can be relatively easily bent and will retain its bent position. A preferred metal is malleable stainless steel, although any other suitable non-corroding metal may be employed.

The cross or transversely extending members 11 to 15, inclusive, are made of spring wire and are provided with sharp points 17 at their exposed ends. These cross members are preferably made of spring stainless steel but again may be made of any suitable non-corroding spring metal. The cross members 11 to 15, inclusive, are secured to the base member 10 by a resistance welding operation similar to projection welding. This is best illustrated in Figs. 5 to 7, inclusive. That is to say, the cross members 11 to 15, inclusive, are properly positioned against the ridge 16 on the base member 10 and then pressed against the base ridge by suitable electrodes engaging the cross members and the base member. A welding current is then supplied to the electrodes so as to fuse the contacting portions of the cross members and the ridge 16. The cross members are pressed into the ridge 16 to form the welds 18 shown most clearly in Fig. 7. The portions of the cross members adjacent the welds 18 are forced into contact with the edge portions 19 of the base member 10 and are maintained in vertical alignment thereby.

In actual fabrication of the barrier of the present invention, the barrier structure is produced by automatic machinery. That is to say, a strip of the base member 10 is fed into an automatic welding machine in a direction longitudinally of the strip. Suitable spring wires are fed laterally of the machine and into contact with the ridge 16 of the base member 10. They are held in properly spaced position and welded to the strip after which the wires are cut to proper length in a manner providing the points 17 and then bent into the configuration shown in Fig. 1. This operation is repeated to provide a continuous length of barrier.

It will be noted that the various cross members 11 to 15, inclusive, are of different lengths and that their ends are curved and bent upwardly at different angles so as to distribute the sharp points 17 over the surface of the barrier with these points extending upwardly and outwardly. Fig. 1 represents one form which has been widely employed commercially, Fig. 2 illustrating a modification of this structure in which the various cross members 21, 22, 23, 24 and 25 are bent at somewhat different angles than those of Fig. 1, the longer cross member 25 being bent upwardly at a sufficiently sharp angle to cross the ends thereof and the shorter cross members 22 being somewhat longer than the shorter cross members 11 of Fig. 1.

Figs. 3 and 4 illustrate a preferred manner of attaching the barrier of the present invention to members having flat surfaces such as building ledges. As shown in these figures, a spring clip 27 having an eye 28 formed in one end thereof to receive a suitable fastening member, such as a nail 29, and a return bent spring loop 31 on its other end, may be employed to detachably secure the barrier to members such as the member 32. Although a nail 29 suitable for attaching the clip 27 to a wooden surface is shown, it is apparent that other fastening devices such as metal cutting screws may be employed for thin metal members or screws or serrated nails with lead or other plugs may be employed for brick or masonry structures, etc.

In the case of a building ledge, the barrier is preferably installed so that the outermost points 17 of the cross members are in vertical alignment with the edge 33 of the ledge, which may be represented by the member 32. It will be appreciated that the return bent portion 31 of the clip 27 forms a spring loop enveloping the base member 10 of the barrier and that the clip members 27 may be first installed by means of the nail 29 or other similar fastening members and the base member of the barrier slipped into the spring loop portion 31. The barrier is frictionally held in position against accidental displacement but may be temporarily removed at any time by merely moving the base member 10 out of the spring loop portion 31.

Fig. 2 shows an alternative manner of installing the barrier structure when the supporting member, such as the rod 34, is of small cross section. A wire 36, preferably of malleable metal, may be wrapped spirally around the support member 34 so as to envelope the base member 10 of the barrier structure. The manner of attaching illustrated in Fig. 2 is particularly effective for such supporting structures as antennas, guy wires, tops of fences, etc. It will be apparent that the supporting member 34 to which the barrier is attached may have any cross section and may, for example, be a wire, rod, angle iron, channel iron, etc.

The barrier of the present invention may be of any desired size, but it is found that a barrier which is approximately four inches wide and three and one-half inches high overall is suitable for most purposes. By way of example, the base member of such a structure may have a width of approximately ¼ inch and a thickness of .020 to .025 inch and the spring wire may also have a diameter of .020 to .025 inch. It will be apparent that such a structure is light in weight. A structure of this size is an effective bird barrier and is also suitable as a rodent guard for rats, rabbits, etc. Smaller barriers may, however, be employed for smaller animals such as mice and, if desired, even larger barriers may be employed for larger animals. On wide ledges, barriers of the size above-mentioned are extremely effective against birds and it is found that one barrier installed on the edge of a ledge is effective for ledges up to approximately two feet wide and that additional barriers spaced two feet apart on extremely wide ledges will prevent the alighting of at least the most obnoxious birds, such as pigeons or starlings; also, birds of any size will not alight near the edge.

The barrier of the present invention is also extremely effective against rats. Rats may be prevented from entering corn cribs or other grain or food storage structures which have a rodent proof floor by merely placing a barrier around the wall of the building a few inches from the ground. Where the building, such as a corn crib, is supported upon columns or posts, the barrier may be wrapped around such posts. The barrier may be as low as one foot from the ground and may be employed to protect trees against climbing by wrapping a single barrier around the tree. Several barriers placed a few inches apart near the base of a tree are effective against rabbits stripping the bark from the tree and may be employed in a similar manner to keep other animals at a distance from the tree trunk. The barrier is also extremely effective as a rat guard on ship's cables. A single turn or several turns of the barrier wrapped around a mooring line will effectively prevent rats from following such cables aboard ship or from the ship to the dock. Docks may be protected by applying the barriers around the edges thereof and around piles supporting the docks.

From the above description of the invention, it will be apparent that we have provided an effective but inexpensive and easily installed barrier for birds, rodents and the like, which barrier may be employed for various other purposes including installation on tops of fences to prevent poultry or animals from surmounting the fence and which may even be employed for this purpose as a guard against humans.

This application is a continuation-in-part of our co-pending application Serial No. 59,882, filed November 13, 1948, and now abandoned.

We claim:

1. A barrier structure, comprising, an elongated generally planar and readily bendable base strip of relatively thin malleable sheet metal having a downwardly projecting longitudinal rib, longitudinally spaced transversely extending members of spring wire welded intermediate their ends to said rib, the ends of said transverse members extending outwardly and upwardly from opposite sides of said base strip.

2. A barrier structure comprising, an elongated generally planar and readily bendable base strip of relatively thin malleable sheet metal having a downwardly projecting longitudinal rib between the lateral edges thereof, longitudinally spaced transversely extending members of spring wire welded intermediate their ends to said rib, said members being pressed into said rib into substantial contact with the lower surface of said base strip on opposite sides of said rib, the ends of said transverse members extending outwardly and upwardly from opposite sides of said base strip.

3. A barrier structure as defined in claim 2, wherein the free ends of all said transversely extending members are pointed.

4. A barrier structure as defined in claim 3, wherein said transversely extending members are of different lengths and have their ends extending upwardly at different angles with respect to said base strip to provide a plurality of upwardly and outwardly directed sharp points distributed over the surface of said barrier.

5. A barrier structure as defined in claim 2 in combination with securing means attachable to a supporting structure, said securing means including a reversely bent resilient portion defining a clip adapted to releasably receive said base strip and thereby frictionally secure said barrier to said supporting structure.

References Cited in the file of this patent
UNITED STATES PATENTS

| | | |
|---|---|---|
| 1,004,996 | Collis | Oct. 3, 1911 |
| 1,896,864 | Hall | Feb. 7, 1933 |
| 2,475,047 | Peles | July 5, 1949 |